US012774105B2

(12) United States Patent
Jarvo et al.

(10) Patent No.: US 12,774,105 B2
(45) Date of Patent: Oct. 27, 2026

(54) BATTERY MANAGEMENT SYSTEM TEMPERATURE SENSING SYSTEMS AND METHODS

(71) Applicant: Pratt & Whitney Canada Corp., Longueuil (CA)

(72) Inventors: James Jarvo, Long Sault (CA); Ezzat Meshkinfam, Mississauga (CA); Remi Robache, Montreal (CA); Raphael Gariepy, Montreal (CA); Michael Hanna, Beaconsfield (CA); Antwan Shenouda, Mississauga (CA); Fraz Ahmad Kharal, Brampton (CA); John Steven Correia, Pierrefonds (CA); Manon Flynn, Toronto (CA)

(73) Assignee: Pratt & Whitney Canada Corp., Longueuil (CA)

(*) Notice: Subject to any disclaimer, the term of this patent is extended or adjusted under 35 U.S.C. 154(b) by 1 day.

(21) Appl. No.: 18/962,634

(22) Filed: Nov. 27, 2024

(65) Prior Publication Data

US 2026/0145806 A1 May 28, 2026

(51) Int. Cl.
*B64D 31/18* (2024.01)
*G01K 1/02* (2021.01)
(Continued)

(52) U.S. Cl.
CPC ............. *B64D 31/18* (2024.01); *G01K 1/026* (2013.01); *G01K 1/14* (2013.01); *G01K 3/005* (2013.01);
(Continued)

(58) Field of Classification Search
CPC .... B64D 31/16; B64D 31/06; B64D 2221/00; B64D 27/357; B64D 31/18;
(Continued)

(56) References Cited

U.S. PATENT DOCUMENTS 9,496,730 B2 11/2016 Gallegos
9,627,720 B2 4/2017 Yun
(Continued)

FOREIGN PATENT DOCUMENTS

EP 4135098 A1 2/2023
FR 3131384 B1 5/2024
(Continued)

OTHER PUBLICATIONS

EP Search Report for EP Patent Application No. 25219216.6 dated Mar. 31, 2026.

*Primary Examiner* — Daniel M. Robert
(74) *Attorney, Agent, or Firm* — Getz Balich LLC

(57) ABSTRACT

A propulsion system for an aircraft includes a battery, a battery management system, and an engine controller. The battery management system includes a plurality of first battery temperature sensors, at least one second battery temperature sensor, and a single-channel battery management system (BMS) controller. The single-channel BMS controller includes a BMS control channel connected in signal communication with the plurality of first temperature sensors. The engine controller includes a first engine control channel and a second engine control channel. The first engine control channel is connected in signal communication with the BMS control channel to form a first control lane. The second engine control channel is connected in signal communication with the at least one second battery temperature sensor to form a second control lane.

20 Claims, 11 Drawing Sheets

(51) Int. Cl.

| | |
|---|---|
| ***G01K 1/14*** | (2021.01) |
| ***G01K 3/00*** | (2006.01) |
| ***G01K 3/14*** | (2006.01) |
| ***H01M 10/42*** | (2006.01) |
| ***H01M 10/48*** | (2006.01) |
| ***H01M 50/249*** | (2021.01) |

(52) U.S. Cl.
CPC ............ *G01K 3/14* (2013.01); *H01M 10/425* (2013.01); *H01M 10/482* (2013.01); *H01M 10/486* (2013.01); *H01M 50/249* (2021.01); *H01M 2010/4271* (2013.01); *H01M 2010/4278* (2013.01); *H01M 2220/20* (2013.01)

(58) Field of Classification Search
CPC ............. H01M 10/425; H01M 10/482; H01M 50/502; H01M 2010/4271; H01M 2010/4278; H01M 2220/20; H01M 10/441; H01M 10/486; H01M 50/204; H01M 50/249; H01M 50/269; H01M 50/574; H01M 50/581; H01M 2200/10; G01R 31/385; H02J 7/80; H02J 7/933; G01K 1/026; G01K 1/14; G01K 3/005; G01K 3/14
See application file for complete search history.

(56) References Cited

U.S. PATENT DOCUMENTS

| | | | | |
|---|---|---|---|---|
| 10,741,889 | B2 | 8/2020 | Newman | |
| 11,817,567 | B2 | 11/2023 | Skroski | |
| 12,027,675 | B2 | 7/2024 | Roos | |
| 2015/0115736 | A1 * | 4/2015 | Snyder | H02J 7/54 307/115 |
| 2016/0226107 | A1 * | 8/2016 | Worry | H01M 10/482 |
| 2016/0261127 | A1 * | 9/2016 | Worry | H01M 10/4207 |
| 2021/0151811 | A1 | 5/2021 | Damgaard | |
| 2022/0094297 | A1 * | 3/2022 | Lacaux | B64D 27/357 |
| 2022/0119121 | A1 * | 4/2022 | Lacaux | H02K 7/14 |
| 2022/0299569 | A1 * | 9/2022 | Kurtz | H01M 10/425 |
| 2023/0155200 | A1 | 5/2023 | Braedon | |
| 2024/0113513 | A1 * | 4/2024 | Syed | F02C 9/48 |
| 2024/0125867 | A1 | 4/2024 | Kumar | |
| 2024/0308350 | A1 | 9/2024 | Gariepy | |
| 2024/0363917 | A1 | 10/2024 | Kim | |
| 2025/0260076 | A1 * | 8/2025 | Colak | H01M 10/482 |

FOREIGN PATENT DOCUMENTS

| | | | | |
|---|---|---|---|---|
| KR | 20140093125 | A * | 7/2014 | B60L 58/10 |
| WO | 2012150119 | A1 | 11/2012 | |

* cited by examiner

BATTERY MANAGEMENT SYSTEM TEMPERATURE SENSING SYSTEMS AND METHODS

TECHNICAL FIELD

This disclosure relates generally to aircraft propulsion systems and, more particularly, to battery management system (BMS) temperature sensing systems and methods for aircraft propulsion systems.

BACKGROUND OF THE ART

Propulsion system architectures for aircraft, such as hybrid-electric propulsion systems, may typically include one or more electrical assemblies configured to support various functions of the propulsion system and an associated aircraft. These electrical assemblies may frequently include batteries configured to provide electrical power for various electrical loads of the aircraft and its propulsion system(s). Various systems and methods for monitoring battery operations are known. While these known systems and methods may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a propulsion system for an aircraft includes a battery, a battery management system, and an engine controller. The battery includes a plurality of battery cells. The battery management system includes a plurality of temperature sensors and a single-channel battery management system (BMS) controller. The plurality of temperature sensors includes a plurality of first temperature sensors and at least one second temperature sensor. Each temperature sensor of the plurality of first temperature sensors is disposed at a respective battery cell of the plurality of battery cells. The at least one second temperature sensor is disposed at the plurality of battery cells. The single-channel BMS controller includes a BMS control channel connected in signal communication with the plurality of first temperature sensors. The engine controller includes a first engine control channel and a second engine control channel. The first engine control channel is connected in signal communication with the BMS control channel to form a first control lane including the first engine control channel, the BMS control channel, and the plurality of first temperature sensors. The second engine control channel is connected in signal communication with the at least one second temperature sensor to form a second control lane, independent of the first control lane, including the second engine control channel and the at least one second temperature sensor.

In any of the aspects or embodiments described above and herein, the at least one second temperature sensor may include a plurality of second temperature sensors, and each temperature sensor of the plurality of second temperature sensors may be disposed at a respective battery cell of the plurality of battery cells.

In any of the aspects or embodiments described above and herein, the BMS control channel, the first engine control channel, and the second engine control channel may each include a processor connected in signal communication with a non-transitory memory storing instructions which, when executed by the processor, may cause the processor to: for the BMS control channel, monitor a T1 temperature of each battery cell of the plurality of battery cells measured using the plurality of first temperature sensors, and for the second engine control channel, monitor a T2 temperature of each battery cell of the plurality of battery cells measured using the plurality of second temperature sensors.

In any of the aspects or embodiments described above and herein, the instructions, when executed by the processor of each of the first engine control channel and the second engine control channel, may further cause the processor to compare the T1 temperature of each battery cell of the plurality of battery cells to the T2 temperature of each respective battery cell of the plurality of battery cells and identify agreement or disagreement between the T1 temperature of each battery cell of the plurality of battery cells and the T2 temperature of each respective battery cell of the plurality of battery cells.

In any of the aspects or embodiments described above and herein, identifying agreement or disagreement between the T1 temperature of each battery cell of the plurality of battery cells and the T2 temperature of each respective battery cell of the plurality of battery cells may include comparing a temperature difference between the T1 temperature of each battery cell of the plurality of battery cells and the T2 temperature of each respective battery cell of the plurality of battery cells to a temperature agreement threshold.

In any of the aspects or embodiments described above and herein, the plurality of battery cells may form an adjacent group of the plurality of battery cells.

In any of the aspects or embodiments described above and herein, the at least one second temperature sensor may include a single, common temperature sensor disposed at the adjacent group of the plurality of battery cells.

In any of the aspects or embodiments described above and herein, the BMS control channel, the first engine control channel, and the second engine control channel may each include a processor connected in signal communication with a non-transitory memory storing instructions which, when executed by the processor, may cause the processor to: for the BMS control channel, monitor a T1 temperature of each battery cell of the plurality of battery cells measured using the plurality of first temperature sensors, and for the second engine control channel, monitor a representative T2 temperature of the adjacent group of the plurality of battery cells measured using the at least one second temperature sensor.

In any of the aspects or embodiments described above and herein, the instructions, when executed by the processor of each of the first engine control channel and the second engine control channel, may further cause the processor to compare the T1 temperature of each battery cell of the plurality of battery cells to the representative T2 temperature and identify agreement or disagreement between the T1 temperature of each battery cell of the plurality of battery cells and the representative T2 temperature.

In any of the aspects or embodiments described above and herein, identifying agreement or disagreement between the T1 temperature of each battery cell of the plurality of battery cells and the representative T2 temperature may include comparing a temperature difference between the T1 temperature of each battery cell of the plurality of battery cells to the representative T2 temperature to a temperature agreement threshold.

In any of the aspects or embodiments described above and herein, the BMS control channel, the first engine control channel, and the second engine control channel may each include a processor connected in signal communication with a non-transitory memory storing instructions which, when executed by the processor, may cause the processor to: execute a model trained to identify a faulted condition or an unfaulted condition of each temperature sensor of the plurality of temperature sensors, based on one or more operating parameters of the propulsion system, by: for the first control channel, comparing a T1 temperature of each battery cell of the plurality of battery cells measured using the plurality of first temperature sensors to a first expected temperature range determined using the one or more operating parameters, and for the second control channel, comparing at least one T2 temperature of the plurality of battery cells measured using the at least one second temperature sensor to a second expected temperature range determined using the one or more operating parameters.

According to another aspect of the present disclosure, a propulsion system for an aircraft includes a battery, a battery management system, and an engine controller. The battery includes an adjacent group of a plurality of battery cells. The battery management system includes a plurality of temperature sensors and a single-channel battery management system (BMS) controller. The plurality of temperature sensors includes a plurality of first temperature sensors and at least one second temperature sensor. Each temperature sensor of the plurality of first temperature sensors is disposed at a respective battery cell of the adjacent group of the plurality of battery cells. The at least one second temperature sensor is disposed at the adjacent group of the plurality of battery cells. The single-channel BMS controller includes a BMS control channel. The engine controller includes a first engine control channel and a second engine control channel. Each of the BMS control channel, the first engine control channel, and the second engine control channel includes an independent processing system. The BMS control channel and the first engine control channel form a first control lane with the plurality of first temperature sensors or the at least one second temperature sensor. The second engine control channel forms a second control lane, independent of the first control lane, with an other of the plurality of first temperature sensors or the at least one second temperature sensor.

In any of the aspects or embodiments described above and herein, the at least one second temperature sensor may include a plurality of second temperature sensors, and each temperature sensor of the plurality of second temperature sensors may be disposed at a respective battery cell of the plurality of battery cells.

In any of the aspects or embodiments described above and herein, the at least one second temperature sensor may include a single, common temperature sensor disposed at the adjacent group of the plurality of battery cells.

In any of the aspects or embodiments described above and herein, each temperature sensor of the plurality of first temperature sensors may have a first temperature sensor configuration, each temperature sensor of the at least one second temperature sensor may have a second temperature sensor configuration, and the second temperature sensor configuration may be different than the first temperature sensor configuration.

In any of the aspects or embodiments described above and herein, each battery cell of the plurality of battery cells may be positioned adjacent at least one other battery cell of the plurality of battery cells.

According to another aspect of the present disclosure, a propulsion system for an aircraft includes a battery, a battery management system, and an engine controller. The battery includes a plurality of battery cells. The battery management system includes a plurality of temperature sensors and a battery management system (BMS) controller. The plurality of temperature sensors includes at least one first temperature sensor and at least one second temperature sensor. The at least one first temperature sensor and the at least one second temperature sensor are disposed at the plurality of battery cells. The BMS controller includes a BMS control channel connected in signal communication with the at least one first temperature sensor. The engine controller includes a first engine control channel and a second engine control channel. The first engine control channel is connected in signal communication with the BMS control channel to form a first control lane including the first engine control channel, the BMS control channel, and the at least one first temperature sensor. The second engine control channel is directly connected in signal communication with the at least one second temperature sensor to form a second control lane, independent of the first control lane, including the second engine control channel and the at least one second temperature sensor.

In any of the aspects or embodiments described above and herein, the at least one first temperature sensor may include a single, common temperature sensor and the at least one second temperature sensor may include a plurality of second temperature sensors, and each temperature sensor of the plurality of second temperature sensors may be disposed at a respective battery cell of the plurality of battery cells.

In any of the aspects or embodiments described above and herein, the at least one first temperature sensor may include a plurality of first temperature sensors, each temperature sensor of the plurality of second temperature sensors may be disposed at a respective battery cell of the plurality of battery cells, and the at least one second temperature sensor may include a single, common temperature sensor.

In any of the aspects or embodiments described above and herein, the at least one first temperature sensor may include a plurality of first temperature sensors, each temperature sensor of the plurality of first temperature sensors may be disposed at a respective battery cell of the plurality of battery cells, the at least one second temperature sensor may include a plurality of second temperature sensors, and each temperature sensor of the plurality of second temperature sensors may be disposed at a respective battery cell of the plurality of battery cells.

The present disclosure, and all its aspects, embodiments and advantages associated therewith will become more readily apparent in view of the detailed description provided below, including the accompanying drawings.

DETAILED DESCRIPTION

Figure 1:
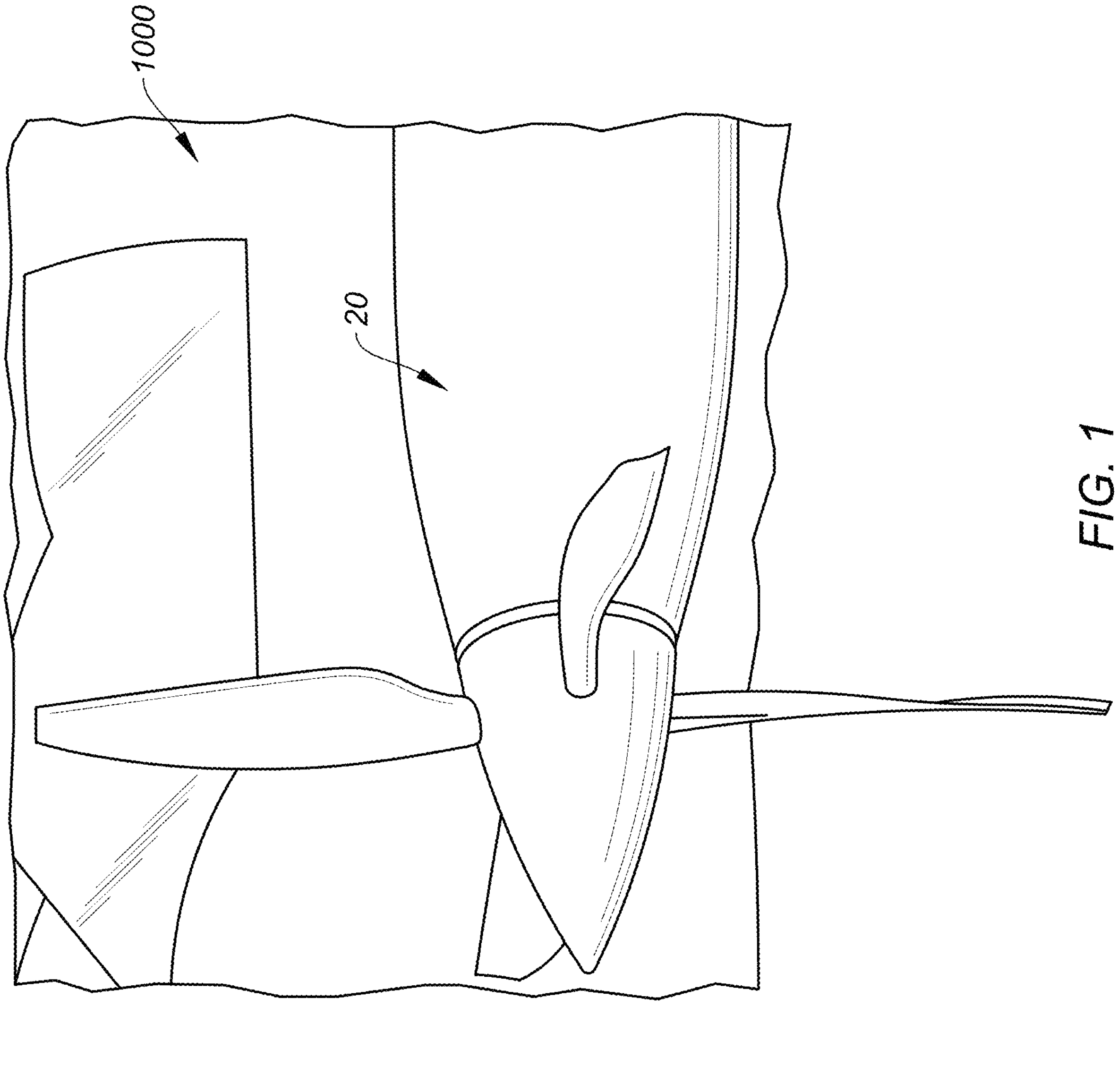
FIG. 1 illustrates an aircraft including a propulsion system, in accordance with one or more embodiments of the present disclosure.

FIG. 1 illustrates an aircraft 1000 including at least one propulsion system 20. Briefly, the aircraft may be a fixed-wing aircraft (e.g., an airplane), a rotary-wing aircraft (e.g., a helicopter), a tilt-rotor aircraft, a tilt-wing aircraft, or another aerial vehicle. Moreover, the aircraft may be a manned aerial vehicle or an unmanned aerial vehicle (UAV, e.g., a drone).

Figure 2:
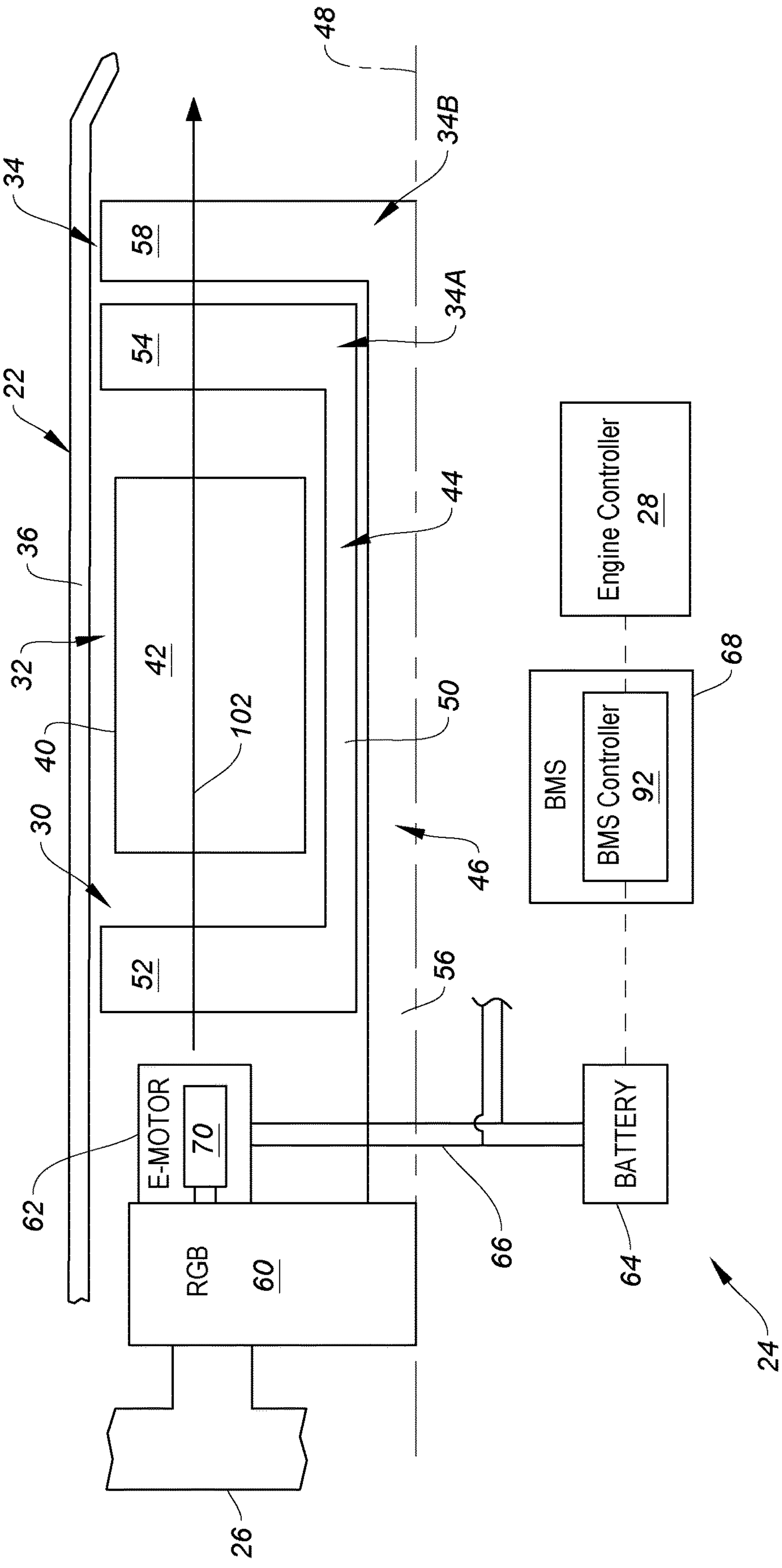
FIG. 2 schematically illustrates a cutaway, side view of an aircraft propulsion system, in accordance with one or more embodiments of the present disclosure.

FIG. 2 schematically illustrates a cutaway, side view of the propulsion system 20. The propulsion system 20 of FIG. 2 includes an engine 22, an electrical assembly 24, a propulsor 26, and an engine controller 28. The engine 22 of FIG. 2 is configured as a turboprop gas turbine engine. However, the present disclosure is not limited to any particular configuration of gas turbine engine for the propulsion system 20, and examples of gas turbine engine configurations for the propulsion system 20 may include, but are not limited to, a turbofan engine, a turbojet engine, a propfan engine, or the like. Aspects of the present disclosure may be equally applicable to aircraft propulsion systems including other engine configurations such as, but not limited to, rotary engines, piston engines, and the like, or to electric aircraft propulsion systems (e.g., battery-electric propulsion systems, fuel-cell-electric propulsion systems, etc.). Aspects of the present disclosure may also be equally applicable to aircraft engines which are not part of a propulsion system, for example, an engine for an auxiliary power unit (APU).

The engine 22 of FIG. 2 includes a compressor section 30, a combustor section 32, a turbine section 34, and an engine static structure 36. The combustor section 32 includes a combustor 40 (e.g., an annular combustor). The combustor 40 forms a combustion chamber 42. The turbine section 34 includes a high-pressure turbine section 34A and a power turbine section 34B.

Components of the compressor section 30 and the turbine section 34 of FIG. 2 form a first rotational assembly 44 (e.g., a high-pressure spool) and a second rotational assembly 46 of the engine 22. The first rotational assembly 44 and the second rotational assembly 46 are mounted for rotation about a rotational axis 48 (e.g., an axial centerline) of the engine 22 relative to the engine static structure 36.

The first rotational assembly 44 includes a first shaft 50, a bladed compressor rotor 52 for the compressor section 30, and a bladed first turbine rotor 54 for the high-pressure turbine section 34A. The first shaft 50 interconnects the bladed compressor rotor 52 and the bladed first turbine rotor 54.

The second rotational assembly 46 of FIG. 2 includes a second shaft 56 and a bladed second turbine rotor 58 for the power turbine section 34B. The second shaft 56 is connected to the bladed second turbine rotor 58. The second shaft 56 operably connects (e.g., directly or indirectly connects) the bladed second turbine rotor 58 with the propulsor 26. For example, the second shaft 56 of FIG. 2 is coupled with the propulsor 26 by a gear box 60 (e.g., a reduction gear box (RGB)). The gear box 60 includes a gear assembly (e.g., an epicyclic gear assembly) coupling the second shaft 56 and the propulsor 26. The gear assembly may be a reduction gear assembly configured to drive rotation of the propulsor 26 at a reduced rotational speed relative to the second shaft 56. Of course, the second shaft 56 may alternatively be directly connected to the propulsor 26 to drive the propulsor 26 at the same rotational speed as the second shaft 56.

The engine static structure 36 includes engine casings, cowlings, and other fixed (e.g., non-rotating) structures of the engine 22 which house and/or support components of the engine 22 such as, but not limited to, those of the compressor section 30, the combustor section 32, and the turbine section 34. The engine static structure 36 includes one or more bearing assemblies and/or gear trains configured to rotationally support and/or interconnect components of the first rotational assembly 44 and the second rotational assembly 46.

The electrical assembly 24 of FIG. 2 includes an electric motor 62, a battery 64, an electrical distribution system 66, and a battery management system (BMS) 68.

The electric motor 62 is electrically connected to the electrical distribution system 66. The electric motor 62 includes a rotor 70. The rotor 70 is coupled to the propulsor 26 by the gear box 60. For example, the gear box 60 may couple both of the second shaft 56 and the rotor 70 to the propulsor 26 to facilitate driving rotation of the propulsor 26 with the bladed second turbine rotor 58 (e.g., via the second shaft 56), the electric motor 62 (e.g., the rotor 70), or a combination of the bladed second turbine rotor 58 and the electric motor 62. The electric motor 62 may additionally include a motor control unit (e.g., an inverter) configured to control electric power characteristics (e.g., frequency, voltage, current) supplied to the electric motor 62 (e.g., windings of the electric motor 62), for example, to control a rotation speed and/or torque of the rotor 70.

The battery 64 is electrically connected to the electrical distribution system 66. The battery 64 is configured to selectively supply electrical power to the electrical distribution system 66 independently (e.g., as a single power source for the electrical assembly 24) or in combination with one or more other electrical power sources (e.g., an electrical generator). As will be discussed in further detail, the battery 64 may include a plurality of battery modules (e.g., battery packs), battery cells, and/or the like electrically connected together in series and/or parallel as necessary to configure the battery 64 with the desired electrical characteristics (e.g., voltage output, current output, storage capacity, etc.). The present disclosure is not limited to any particular configuration of the battery 64. The battery 64 (e.g., and its battery cells) may be configured as a rechargeable battery having a battery chemistry such as, but not limited to, lead acid, nickel cadmium (NiCd), nickel-metal hydride (Ni-MH), lithium-ion (Li-ion), lithium-polymer (Li-poly), lithium metal, and the like. The battery 64 may be disposed, for example, in the aircraft 1000 and/or its propulsion system 20.

During operation of the propulsion system 20 of FIG. 2, ambient air enters the propulsion system 20 through an air intake into and through a core flow path of the engine 22. The ambient air flow along the core flow path is compressed in the compressor section 30 and directed into the combustor 40. Fuel is injected into the combustor 40 (e.g., the combustion chamber 42) and mixed with the compressed air to provide a fuel-air mixture. This fuel-air mixture is ignited, and combustion products thereof flow through the high-pressure turbine section 34A and the power turbine section 34B and are exhausted from the propulsion system 20. The bladed first turbine rotor 54 and the bladed second turbine rotor 58 rotationally drive the first rotational assembly 44 and the second rotational assembly 46, respectively, in response to the combustion gas flow through the high-pressure turbine section 34A and the power turbine section 34B. The second rotational assembly 46 (e.g., the second shaft 56) may drive rotation of the propulsor 26, for example, through the gear box 60. The electric motor 62 may be selectively operated (e.g., by the engine controller 28) to drive rotation of the propulsor 26 independently or in combination with the engine 22 through the gear box 60.

Figure 3:
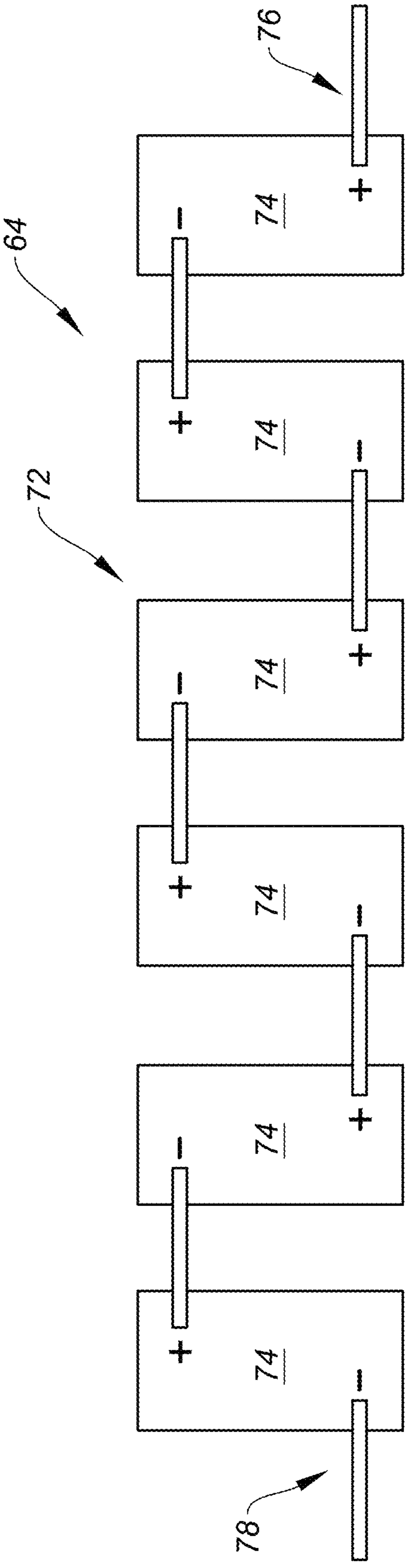
FIG. 3 schematically illustrates a battery string for a battery, in accordance with one or more embodiments of the present disclosure.

FIG. 3 schematically illustrates an exemplary battery string 72 of the battery 64. The battery string 72 of FIG. 3 includes a plurality of battery modules 74 (e.g., battery packs electrically connected in series to form the battery string 72. For example, each battery modules 74 of the battery string 72 may be electrically connected in series (e.g., positive to negative or negative to positive) to one or more other battery modules 74 of the battery string 72. The battery string 72 includes a positive string terminal 76 and a negative string terminal 78 for connecting the battery string 72 in electrical communication with other components of the battery 64 and/or the electrical distribution system 66. The battery string 72 of FIG. 3 includes six (6) battery modules 74 electrically connected in series. The present disclosure, however, is not limited to any particular number of battery modules 74 for the battery string 72. Each battery module 74 may include a plurality of discrete battery cells electrically connected together (e.g., using series and/or parallel electrical connections) to form the battery module 74, and as necessary to configure the battery string 72 with the desired electrical characteristics (e.g., voltage output, power output, etc.) for the battery 64.

Figure 4:
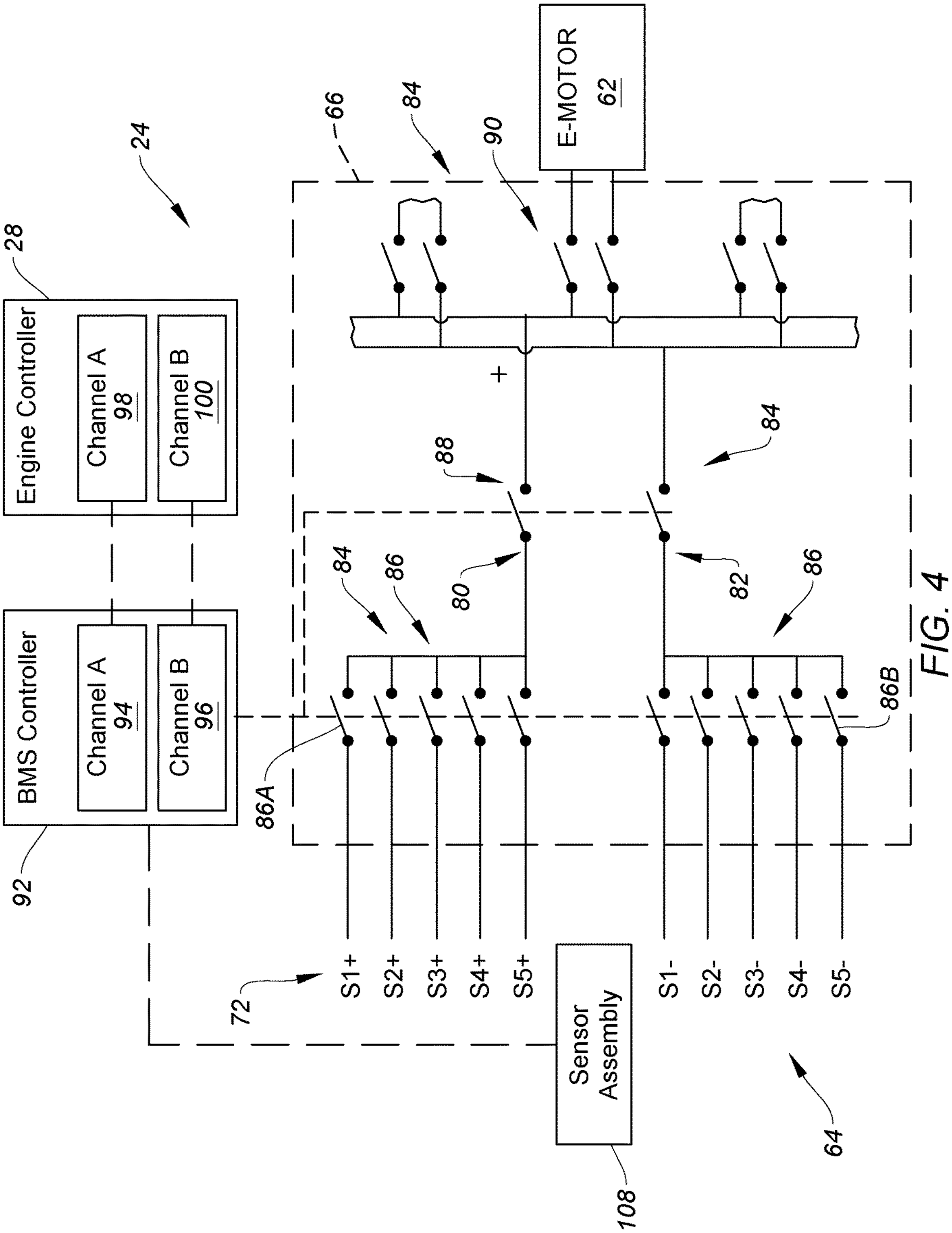
FIG. 4 schematically illustrates an electrical assembly for an aircraft propulsion system, in accordance with one or more embodiments of the present disclosure.

FIG. 4 schematically illustrates a portion of the electrical assembly 24 including the battery 64, the electrical distribution system 66, and the battery management system 68. The battery 64 of FIG. 4 includes a plurality of the battery strings 72 electrically connected together in parallel. For example, the plurality of battery strings 72 of FIG. 4 includes five (5) battery strings 72, S1-5 with their positive string terminals 76 (e.g., S1+, S2+, S3+, S4+, S5+) electrically connected together at a positive battery terminal 80 of the battery 64 and their negative string terminals 78 (e.g., S1−, S2−, S3−, S4−, S5−) electrically connected together at a negative battery terminal 82 of the battery 64.

The electrical distribution system 66 electrically interconnects components of the electrical assembly 24. The electrical distribution system 66 includes switchgear, cables, wires, breakers, switches, contactors, electrical power conditional and/or conversion (e.g., AC to DC or DC to AC conversion) components, and/or other electrical components to effect the transfer of electrical power between components of the electrical assembly 24. For example, the electrical distribution system 66 of FIG. 2 electrically connects the electric motor 62 (and other electrical loads of the aircraft 1000 and/or the propulsion system 20) with the battery 64 and other electric power sources (e.g., an electrical generator) of the electrical assembly 24. The electrical distribution system 66 may additionally include one or more electrical power controllers, for example, to control a magnitude and/or direction of electrical current flow to components of the electrical assembly 24. The electrical distribution system 66 is configured to supply electrical power to electrical loads of the aircraft 1000, the propulsion system 20, and/or the engine 22.

The electrical assembly 24 includes a plurality of electrical contactors 84. The contactors 84 are configured to facilitate selective control of electrical current flow through the electrical assembly 24 and its components including, but not limited to, the electric motor 62, the battery 64, and the electrical distribution system 66. The contactors 84 are selectively configurable (e.g., switchable) in and between a closed condition or an open condition to conduct or interrupt an electrical current flow, respectively. The contactors 84 may include electrically-controlled relays or switches which may be controlled by an electrical control signal to position the respective contactors 84 in open condition or the closed condition. The contactors 84 of FIG. 4 include string contactors 86, battery contactors 88, and load contactors 90. Of course, the present disclosure is not limited to the foregoing exemplary categories of electrical contactors.

The battery management system 68 includes a BMS controller 92. The BMS controller 92 and/or the engine controller 28 may be configured as a dual channel controller. For example, the BMS controller 92 of FIG. 4 includes a first control channel 94 ("Channel A") and a second control channel 96 ("Channel B"). The first control channel 94 is connected in signal communication with a first control channel 98 ("Channel A") of the engine controller 28. The second control channel 96 is connected in signal communication with a second control channel 100 ("Channel B) of the engine controller 28. Communication between the first control channel 94 and the first control channel 98 is independent of communication between the second control channel 96 and the second control channel 100. Accordingly, the first control channels 94, 98 may be understood to form a first control lane and the second control channel 96, 100 may be understood to form a second control lane independent of the first control lane. Briefly, the engine controller 28 may control operating parameters of the engine 22 including, but not limited to, fuel flow, stator vane position (e.g., variable compressor inlet guide vane (IGV) position), compressor air bleed valve position, shaft (e.g., first shaft 50 and/or second shaft 56) torque and/or rotation speed, etc. so as to control an engine power or performance of the propulsion system 20. In some embodiments, the engine controller 28 may be part of a full authority digital engine control (FADEC) system for the propulsion system 20 and its engine 22. The engine controller 28 receives signals from the BMS controller 92 to facilitate operation and control of the engine 22 and the electrical assembly 24 by the engine controller 28 or by the engine controller 28 and the BMS controller 92 in combination.

Figure 5:
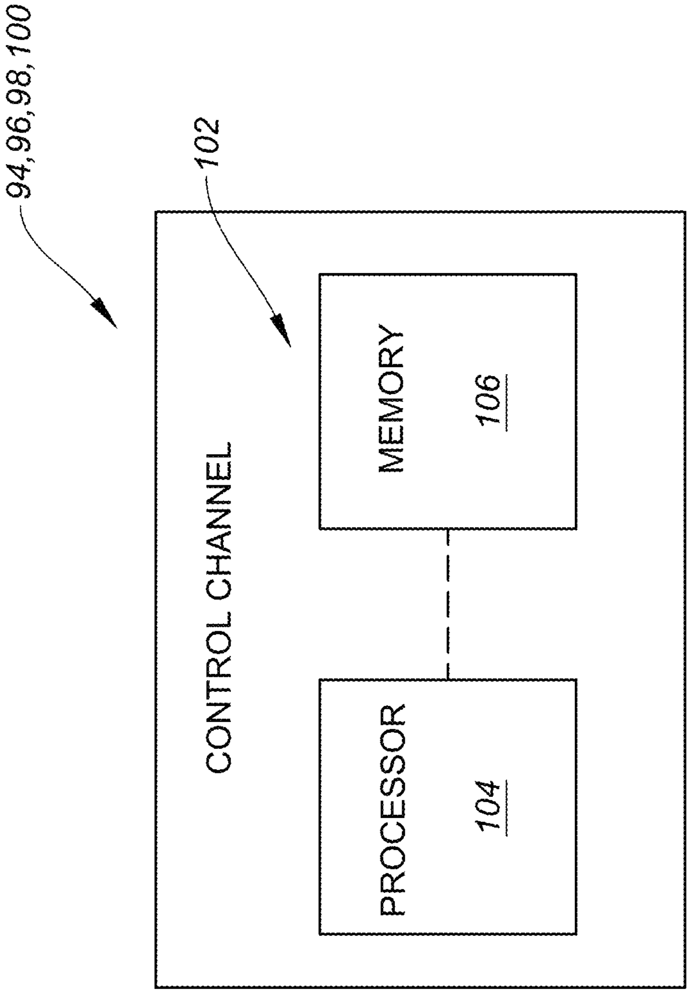
FIG. 5 illustrates a block diagram depicting a control channel, in accordance with one or more embodiments of the present disclosure.

Referring briefly to FIG. 5, each of the control channels 94, 96, 98, 100 includes a discrete processing system 102.

The processing system 102 includes a processor 104 connected in signal communication with memory 106. The processor 104 may include any type of computing device, computational circuit, processor(s), central processing unit (CPU), graphics processing unit (GPU), computer, or the like capable of executing a series of instructions that are stored in memory 106. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the processing system 102 and its processor 104 to accomplish the same algorithmically and/or coordination of electrical assembly 24 components including, but not limited to, the electric motor 62, the battery 64, the electric distribution system 66, and the battery management system 68. The memory 106 may include a single memory device or a plurality of memory devices (e.g., a computer-readable storage device that can be read, written, or otherwise accessed by a general purpose or special purpose computing device, including any processing electronics and/or processing circuitry capable of executing instructions). The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) may be directly and/or indirectly coupled to the respective one of the engine controller 28 or the BMS controller 92. The processing system 102 may include, or may be in communication with, a user interface including one or more inputs devices and/or one or more output devices, for example, an input device that enables a user to enter data and/or instructions and an output device configured to display information (e.g., a visual display or a printer), or to transfer data, etc. Communications between the processing system 102 and external electrical or electronic devices may be via a hardwire connection or via a wireless connection. A person of skill in the art will recognize that portions of the processing system 102 may assume various forms (e.g., digital signal processor, analog device, etc.). In some embodiments, the first control channel 94 and/or the second control channel 96 may have a hardware configuration which is different than the first control channel 98 and/or the second control channel 100, for example, to prevent or mitigate the risk of a common mode hardware failure of the control channels 94, 96, 98, 100.

The battery management system 68 and its BMS controller 92 is configured to monitor conditions of the battery 64 such as, but not limited to, state of charge, state of health, temperature, voltage, current, battery faults, arc discharges, and the like, to facilitate operation and control of the electrical assembly 24 and the battery 64. The battery management system 68 includes a battery sensor assembly 108 connected in signal communication with the BMS controller 92. The battery sensor assembly 108 may include sensors such as, but not limited to, voltage sensors, temperature sensors, coolant temperature and/or flow sensors, current sensors, and the like for the battery 64.

Figure 6A:
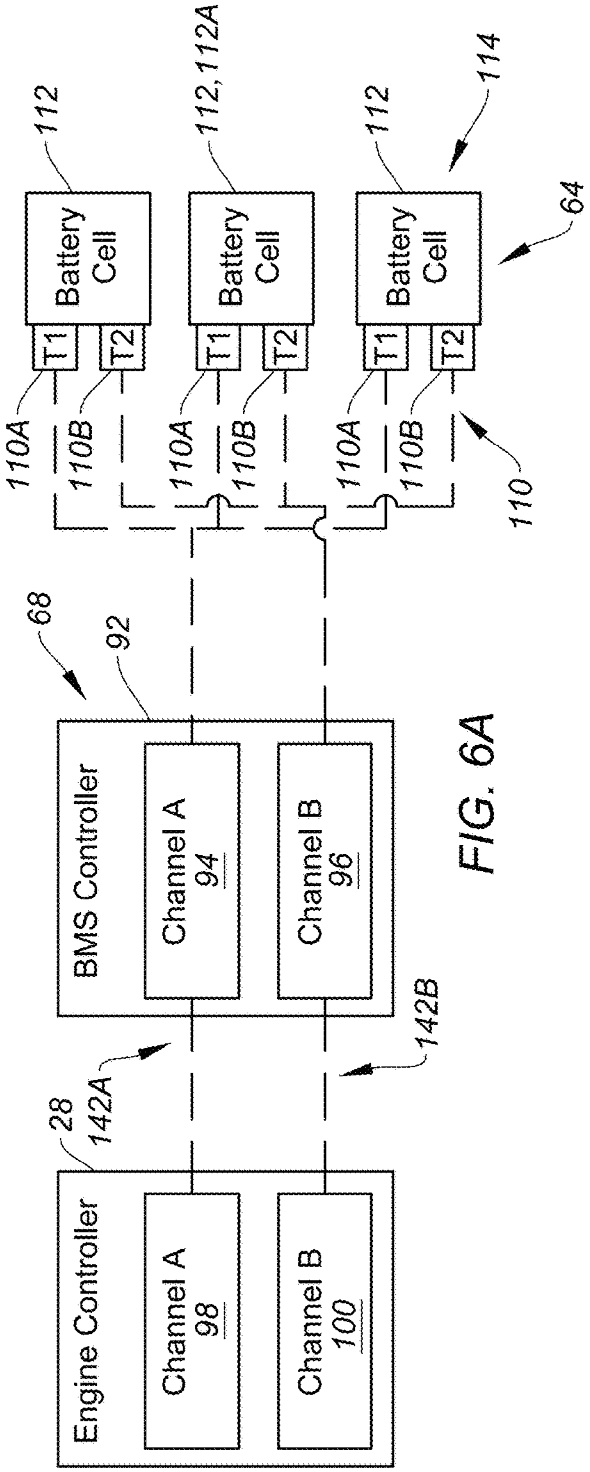
FIGS. 6A-B schematically illustrate electrical assemblies each including a battery and a battery management system, in accordance with one or more embodiments of the present disclosure.
Figure 6B:
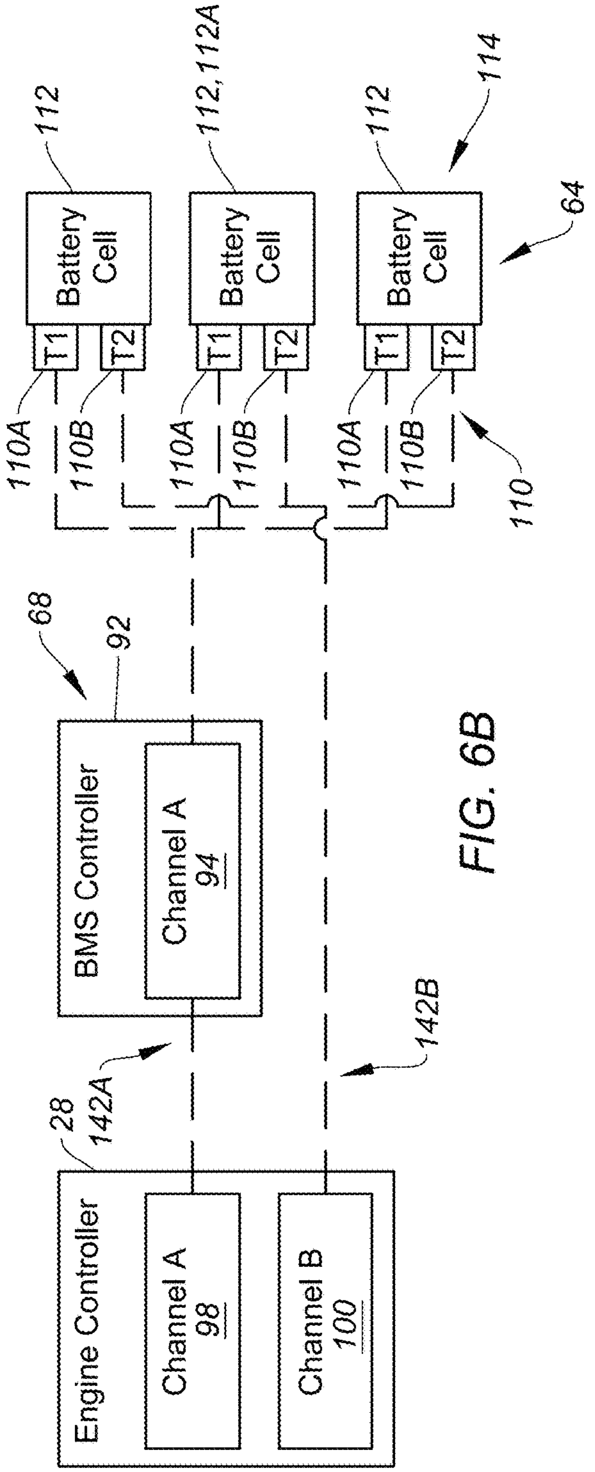

Referring to FIGS. 6A and 6B, the battery sensor assembly 108 includes a plurality of temperature sensors 110 configured to measure at (e.g., on, adjacent, or proximate) the battery 64. In particular, the temperature sensors 110 are configured to measure localized temperatures at (e.g., within, on, adjacent, or proximate) battery cells 112 of the battery 64. The battery cells 112 may be arranged and electrically connected together to form one of the battery modules 74, or to otherwise form a portion of the battery 64. The battery cells 112 may be understood to as a smallest discrete unit of the battery 64 configured to convert chemical energy to electrical energy and vice versa (e.g., each of the battery cells 112 may include a cathode, an anode, and an electrolyte). The battery cells 112 may be configured as cylindrical cells, pouch cells, prismatic cells, and the like, and the present disclosure is not limited to any particular configuration of the battery cells 112. The battery cells 112 may be arranged as an adjacent group 114 of the battery cells 112. For example, each of the battery cells 112, arranged as the adjacent group 114, may be positioned adjacent (e.g., directly next to or contacting) one or more other battery cells 112 of the adjacent group 114. The adjacent group 114 of the battery cells 112 may form all or a portion of one of the battery modules 74; however, the present disclosure is not limited to this particular configuration of the battery 64. The battery 64 may include a plurality of different adjacent groups 114 of battery cells, such as the battery cells 112. The temperature sensors 110 of FIGS. 6A and 6B include a plurality of first temperature sensors 110A and a plurality of second temperature sensors 110B. Each of the first temperature sensors 110A is disposed at (e.g., within, on, adjacent, or proximate) a respective one of the battery cells 112 to measure a temperature (e.g., a T1 temperature) of that battery cell 112. Similarly, each of the second temperature sensors 110B is disposed at (e.g., within, on, adjacent, or proximate) a respective one of the battery cells 112 to measure a temperature (e.g., a T2 temperature) of that battery cell 112. In other words, a temperature of each of the battery cells 112 is measured by one of the first temperature sensors 110A and one of the second temperature sensors 110B dedicated for that particular battery cell 112. Examples of configurations of the temperature sensors 110 include, but are not limited to, resistance temperature detectors (RTDs), thermistors, thermocouples, and the like, and the present disclosure is not limited to any particular configuration of the temperature sensors 110. In some embodiments, the temperature sensors 110 may include more than one type and/or configuration of temperature sensor, for example, to reduce a probability of a temperature sensor common mode failure.

Each of the first temperature sensors 110A of FIGS. 6A and 6B is connected in signal communication with the first control channel 94 of the BMS controller 92 along a first control lane 142A. The first control lane 142A of FIGS. 6A and 6B includes the first temperature sensors 110A, the first control channel 94, and the first control channel 98 of the engine controller 28 connected in signal communication with the first control channel 94.

Each of the second temperature sensors 110B of FIG. 6A is connected (e.g., directly connected) in signal communication with the second control channel 96 of the BMS controller 92 along a second control lane 142B independent of the first control lane 142A. The second control lane 142B of FIG. 6A includes the second temperature sensors 110B, the second control channel 96, and the second control channel 100 of the engine controller 28 connected in signal communication with the second control channel 96. The first control channel 94 and the second control channel 96 are configured to independently monitor the cell temperatures of the battery cells 112 using the first temperature sensors 110A and the second temperature sensors 110B, respectively.

Each of the second temperature sensors 110B of FIG. 6B is connected (e.g., directly connected) in signal communication with the second control channel 100 of the engine controller 28 along the second control lane 142B independent of the first control lane 142A. The second control lane 142B of FIG. 6B includes the second temperature sensors 110B and the second control channel 100. The first control channel 94 and the second control channel 100 are configured to independently monitor the cell temperatures of the battery cells 112 using the first temperature sensors 110A and the second temperature sensors 110B, respectively. The configuration of the first control lane 142A and the second control lane 142B of FIG. 6B may facilitate redundant temperature monitoring of the cell temperatures of the battery cells 112, for example, with configurations of the BMS controller 92 which do not including a second control channel (e.g., a single channel controller), thereby facilitating implementation of the present disclosure with existing (e.g., installed) single-channel BMS controllers.

During operation of the electrical assembly 24, the cell temperatures of the battery cells 112 may be monitored to ensure continued safe operation of the battery 64. Battery cells, and particularly those having a lithium-ion chemistry, may be susceptible in some rare cases to thermal runaway, wherein the battery cell enters an uncontrollable self-heating state. Accordingly, monitoring the cell temperatures of the battery cells 112 may be useful for identifying and preventing or reducing the severity of thermal runaway events. Of course, temperature monitoring and control of battery cells may also be important for cell configurations and chemistries other than lithium-ion cells. The independent configuration of the temperature sensors 110A, 110B and respective control lanes 142A, 142B of the battery management systems 68 of FIGS. 6A and 6B facilitate continued temperature monitoring for each of the battery cells 112. For example, in the event of a failure of one of the temperature sensors 110A, 110B at a given battery cell 112, the other of the temperature sensors 110A, 110B at the given battery cell 112 may still provide an indicate of the cell temperature of the given battery cell 112.

The engine controller 28 may compare cell temperatures (e.g., T1 and T2 temperatures) from each of the battery cells 112 together to verify agreement between the one of the first temperature sensors 110A and the one of the second temperature sensors 110B for each of the battery cells 112. The engine controller 28 may identify agreement between the T1 temperatures and the corresponding T2 temperatures where a difference between the T1 temperatures and the corresponding T2 temperatures is less than a temperature agreement threshold (e.g., a predetermined threshold value). Conversely, the engine controller 28 may identify disagreement between the T1 temperatures and the corresponding T2 temperatures where a difference between the T1 temperatures and the corresponding T2 temperatures is greater than the temperature agreement threshold (e.g., a predetermined threshold value).

In response to or independent of identifying disagreement between the T1 temperature and the T2 temperature for a given one of the battery cells 112, the engine controller 28 may additionally identify a sensor failure of the one of the first temperature sensors 110A or the one of the second temperature sensors 110B for the given battery cell 112 exhibiting temperature disagreement (the "faulted battery cell" 112A) between the T1 temperature and the T2 temperature. Identification of agreement, disagreement, failure, or other evaluation of the temperature sensors 110 is described herein as being performed by the engine controller 28, but could alternatively be performed by the BMS 92, another discrete controller, or a combination of these controllers.

Figure 7:
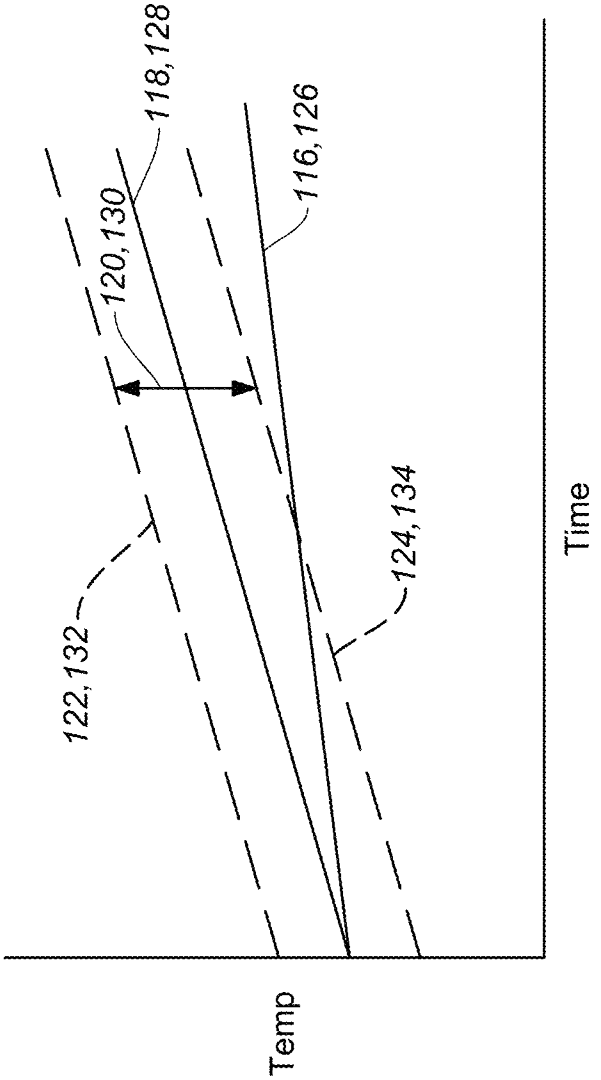
FIG. 7 illustrates an exemplary battery cell temperature transient response and temperature monitoring features, in accordance with one or more embodiments of the present disclosure.

FIG. 7 illustrates an exemplary temperature transient condition for the battery cells 112 with a temperature of the battery cells 112 increasing over time (e.g., in response to an increase in battery 64 discharge or charge current). To identify a sensor failure of the one of the first temperature sensors 110A for the faulted battery cell 112A, the engine controller 28 may compare the T1 temperature of the faulted battery cell 112A to T1 temperatures of one, more than one, or each of the battery cells 112 adjacent the faulted battery cell 112A (the "adjacent T1 temperatures"). For example, the engine controller 28 may compare a T1 temperature 116 of the faulted battery cell 112A to a temperature average 118 of the adjacent T1 temperatures. Based on the value of the temperature average 118, the engine controller 28 may determine a threshold range 120 having a maximum temperature value 122 and a minimum temperature value 124. The engine controller 28 may identify a failure of the one of the first temperature sensors 110A for the faulted battery cell 112A where the T1 temperature 116 of the faulted battery cell 112A is outside of the threshold range 120. The engine controller 28 may continuously update the threshold range 120 and compare the T1 temperature 116 to the threshold range 120 to determine the one of the first temperature sensors 110A for the faulted battery cell 112A is unfaulted or faulted. Similarly, to identify a sensor failure of the one of the second temperature sensors 110B for the faulted battery cell 112A, the engine controller 28 may compare the T2 temperature of the faulted battery cell 112A to T2 temperatures of one, more than one, or each of the battery cells 112 adjacent the faulted battery cell 112A (the "adjacent T2 temperatures"). For example, the engine controller 28 may compare a T2 temperature 126 of the faulted battery cell 112A to a temperature average 128 of the adjacent T2 temperatures. Based on the value of the temperature average 128, the engine controller 28 may determine a threshold range 130 having a maximum temperature value 132 and a minimum temperature value 134. The engine controller 28 may identify a failure of the one of the second temperature sensors 110B for the faulted battery cell 112A where the T2 temperature 126 of the faulted battery cell 112A is outside of the threshold range 130. The engine controller 28 may continuously update the threshold range 130 and compare the T2 temperature 126 to the threshold range 130 to determine the one of the second temperature sensors 110B for the faulted battery cell 112A is unfaulted or faulted.

Figure 8A:
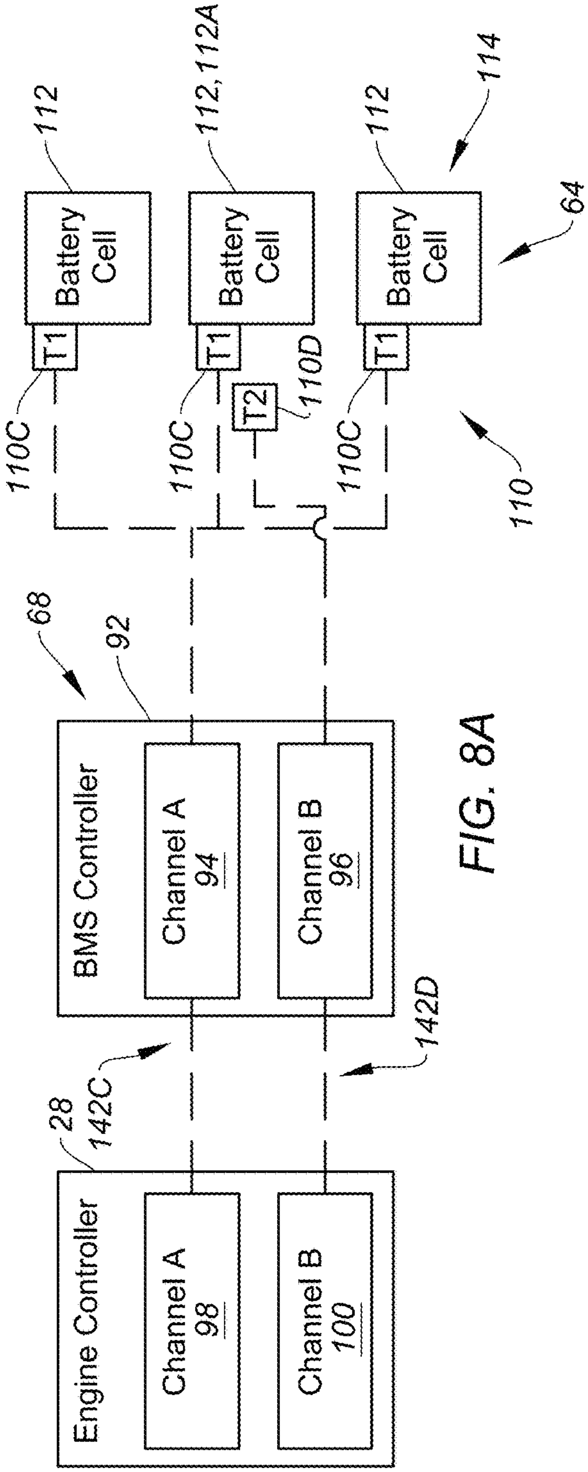
FIGS. 8A-B schematically illustrate electrical assemblies each including a battery and another battery management system, in accordance with one or more embodiments of the present disclosure.
Figure 8B:
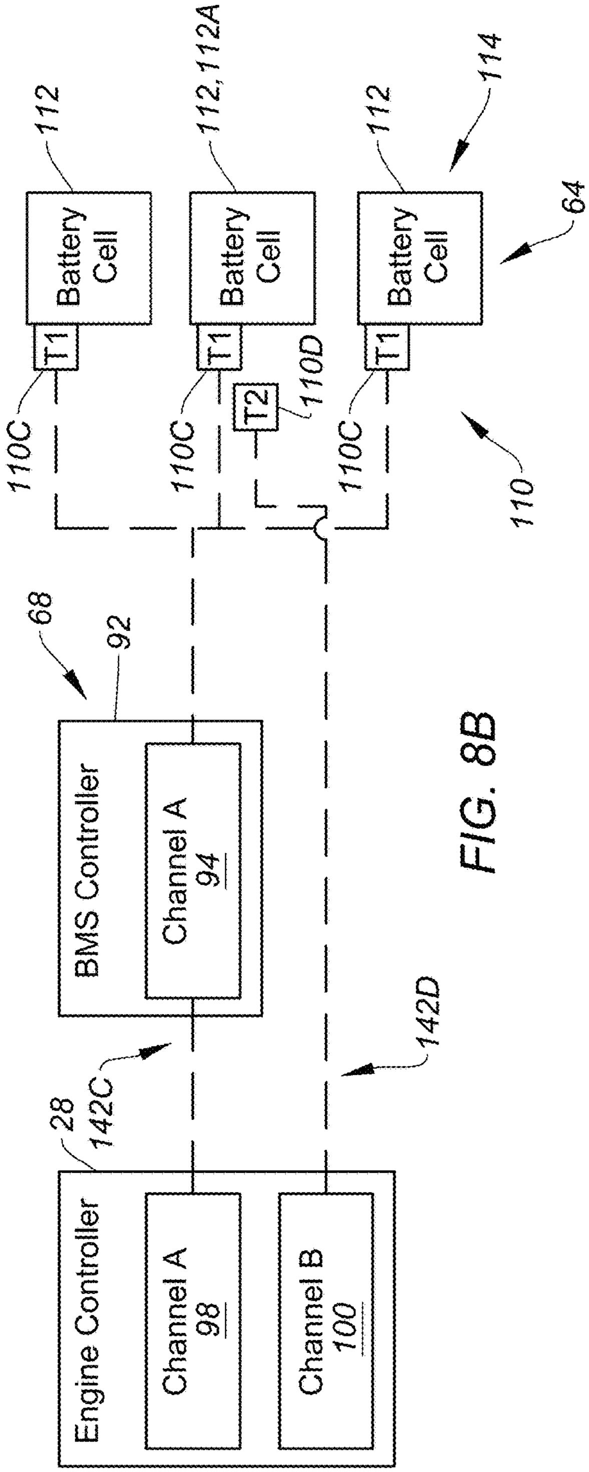
Figure 10:
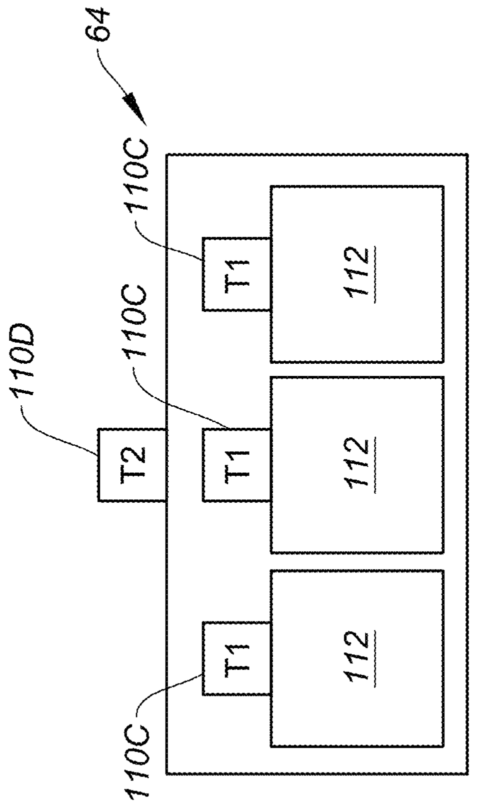
FIG. 10 schematically illustrates a battery cell temperature sensor arrangement for the battery management system of FIG. 8, in accordance with one or more embodiments of the present disclosure.
Figure 9:
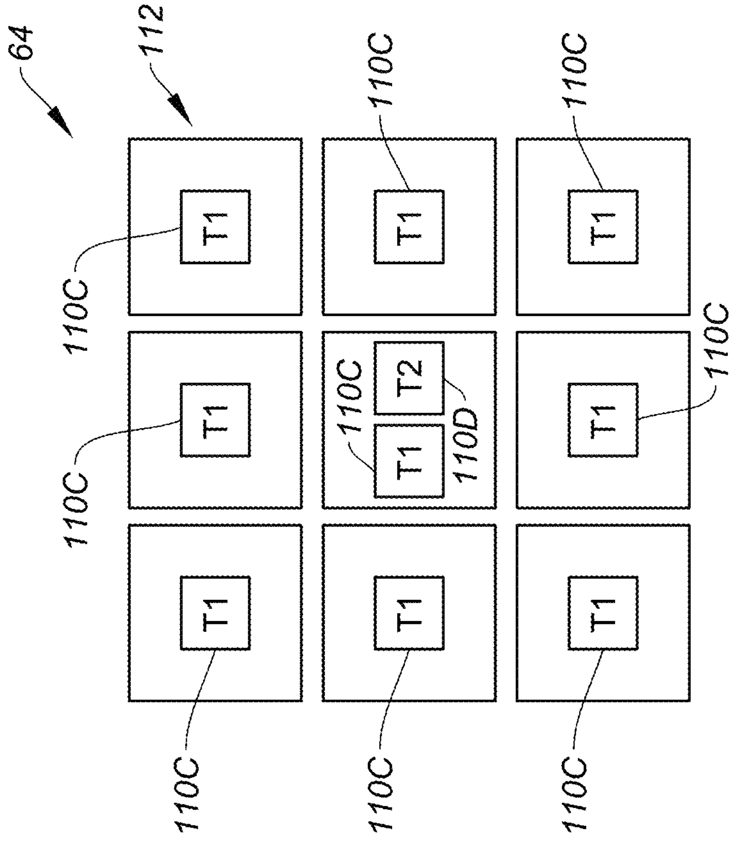
FIG. 9 schematically illustrates a battery cell temperature sensor arrangement for the battery management system of FIG. 8, in accordance with one or more embodiments of the present disclosure.

Referring to FIGS. 8-10, in some embodiments, the temperature sensors 110 may include a plurality of first temperature sensors 110C and a common second temperature sensor 110D for the (or each) adjacent group 114 of the battery cells 112. Each of the first temperature sensors 110A is disposed at (e.g., within, on, adjacent, or proximate) a respective one of the battery cells 112 of the adjacent group 114 to measure a temperature (e.g., a T1 temperature) of that battery cell 112. The common second temperature sensor 110D is a single temperature sensor positioned at (e.g., on, adjacent, or proximate) the adjacent group 114 of the battery cells 112 to measure a representative temperature (e.g., a T2 temperature) for each of the battery cells 112 of the adjacent group 114. As shown in FIGS. 9 and 10, for example, the common second temperature sensor 110D may be centrally positioned relative to the battery cells 112 of the adjacent group 114 to measure the representative T2 temperature which is approximately representative of an average temperature of the battery cells 112 of the adjacent group 114.

Each of the first temperature sensors 110C of FIGS. 8A and 8B is connected (e.g., directly connected) in signal communication with the first control channel 94 of the BMS controller 92 along a first control lane 142C. The first control lane 142C of FIGS. 8A and 8B includes the first temperature sensors 110C, the first control channel 94, and the first control channel 98 of the engine controller 28 connected in signal communication with the first control channel 94.

The common second temperature sensor 110D of FIG. 8A is connected (e.g., directly connect) in signal communication with the second control channel 96 of the BMS controller 92 along a second control lane 142D independent of the first control lane 142C. The second control lane 142B of FIG. 8A includes the common second temperature sensor 110D, the second control channel 96, and the second control channel 100 of the engine controller 28 connected in signal communication with the second control channel 96.

The common second temperature sensor 110D of FIG. 8B is connected (e.g., directly connected) in signal communication with the second control channel 100 of the engine controller 28 along the second control lane 142D independent of the first control lane 142C. The second control lane 142D of FIG. 8B includes the common second temperature sensor 110D and the second control channel 100. The first control channel 94 and the second control channel 100 are configured to independently monitor the cell temperatures of the battery cells 112 using the first temperature sensors 110C and the common second temperature sensors 110D, respectively. While the first temperature sensors 110C and the common second temperature sensor 110D of FIG. 8B are connected in signal communication with the first control channel 94 and the second control channel 100, respectively, the temperature sensors 110 may alternatively be configured with the first temperature sensors 110C connected in signal communication with the second control channel 100 (e.g., the engine controller 28) and the common second temperature sensor 110D connected in signal communication with the first control channel 94 (e.g., the BMS controller 92). Measuring a T2 temperature of the battery cells 112 of the adjacent group 114 with the single, common second temperature sensor 110D, the battery management system 68 of FIGS. 8-10 may facilitate reductions in cost, weight, and complexity of the electrical assembly 24.

The engine controller 28 (and/or the BMS controller 92) may identify agreement, disagreement, and/or failure of the temperature sensors 110C, 110D similar to that described above. For example, the engine controller 28 may identify agreement between the T1 temperatures and the corresponding T2 temperatures where a difference between the each of the T1 temperatures and the T2 temperature is less than a temperature agreement threshold (e.g., a predetermined threshold value). Conversely, the engine controller 28 may identify disagreement between the T1 temperatures and the T2 temperature where a difference between each of the T1 temperatures and the T2 temperature is greater than the temperature agreement threshold (e.g., a predetermined threshold value). The engine controller 28 may identify a failure of the one of the first temperature sensors 110C for the faulted battery cell 112A where the T1 temperature of the faulted battery cell 112A is outside of a threshold range determined based on an average T1 temperature of the battery cells 112 of the adjacent group 114 (see FIGS. 6-7 and corresponding discussion above). The engine controller 28 may identify a failure of the common second temperature sensor 110D where the T2 temperature is outside of a threshold range determined based on the average T1 temperature of the battery cells 112 of the adjacent group 114.

Figure 11A:
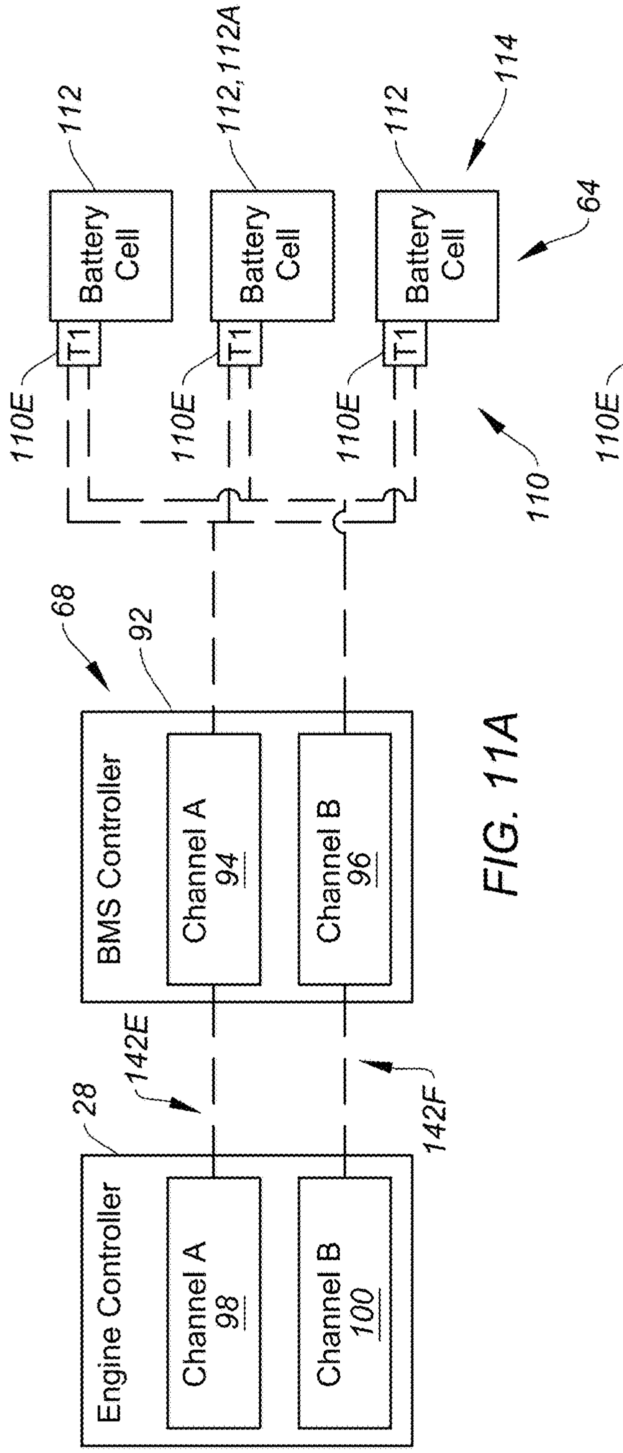
FIGS. 11A and 11B schematically illustrate electrical assemblies each including a battery and another battery management system, in accordance with one or more embodiments of the present disclosure.
Figure 11B:
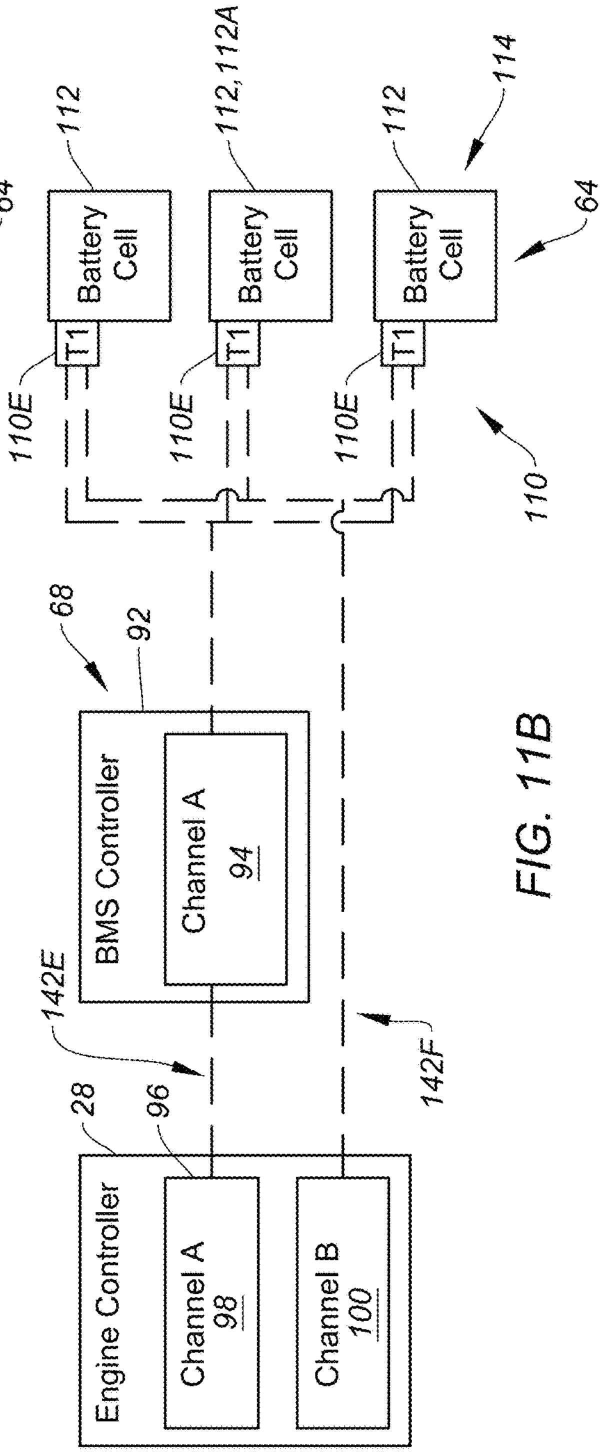

Referring to FIGS. 11A and 11B, in some embodiments, the temperature sensors 110 may include a plurality of first temperature sensors 110E. The temperatures of the battery cells 112 may be directly measured only by the first temperature sensors 110E. In other words, the temperature sensors 110 of FIG. 11 may not include second temperature sensors for each of the battery cells 112 or for the adjacent group 114 of the battery cells 112 (e.g., a common temperature sensor). Each of the first temperature sensors 110E of FIGS. 11A and 11B is connected in signal communication with the first control channel 94 of the BMS controller 92 along a first control lane 142E. The first control lane 142E of FIGS. 11A and 11B includes the first temperature sensors 110E, the first control channel 94, and the first control channel 98 of the engine controller 28 connected in signal communication with the first control channel 94.

Each of the first temperature sensors 110E of FIG. 11A is additionally connected (e.g., directly connected) in signal communication with the second control channel 96 of the BMS controller 92 along a second control lane 142F. The second control lane 142F of FIG. 11A includes the first temperature sensors 110E, the second control channel 96, and the second control channel 100 of the engine controller 28 connected in signal communication with the second control channel 96.

Each of the first temperature sensors 110E of FIG. 11B is additionally connected (e.g., directly connected) in signal communication with the second control channel 100 of the engine controller 28 along the second control lane 142F. The second control lane 142F of FIG. 11B includes the first temperature sensors 110E and the second control channel 100 of the engine controller 28. The use of a single temperature sensor 110 (e.g., the first temperature sensors 110E) for each of the battery cells 112, as described above with respect to FIGS. 11A and 11B, may facilitate further reductions in cost, weight, and complexity of the electrical assembly 24.

The engine controller 28 (and/or the BMS controller 92) may identify failure of the first temperature sensors 110E similar to that described above. For example, the engine controller 28 may identify a failure of the one of the first temperature sensors 110E for the faulted battery cell 112A where the T1 temperature of the faulted battery cell 112A is outside of a threshold range determined based on an average T1 temperature of the battery cells 112 of the adjacent group 114 (see FIGS. 6-11 and corresponding discussion above).

Figure 12:
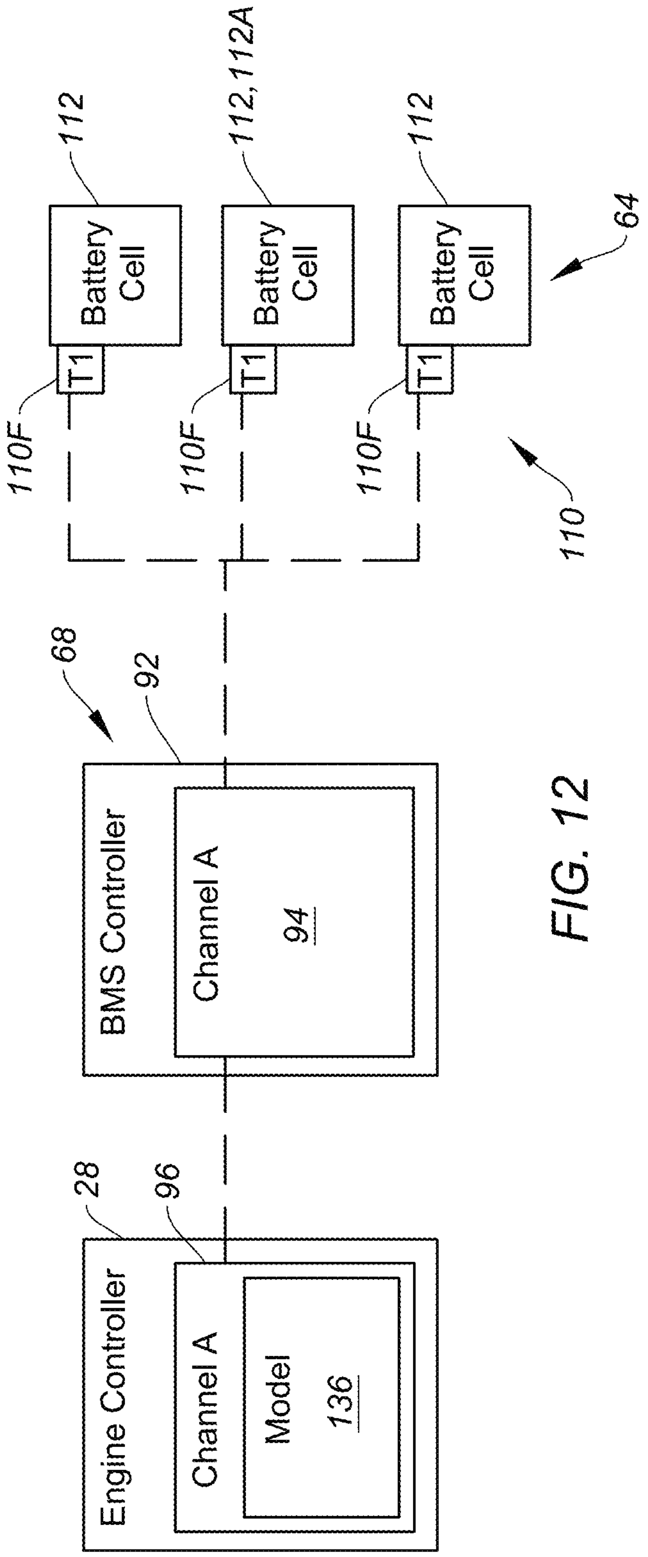
FIG. 12 schematically illustrates an electrical assembly including a battery and another battery management system, in accordance with one or more embodiments of the present disclosure.

Referring to FIG. 12, in some embodiments, the BMS controller 92 and the engine controller 28 may be configured for single channel monitoring of the cell temperatures of the battery cells 112. In other words, the cell temperatures of the battery cells 112 may be monitored by (e.g., only by) the first control channel 94 and the first control channel 98. The temperature sensors 110 of FIG. 12 include a plurality of first temperature sensors 110F. The temperatures of the battery cells 112 may be directly measured only by the first temperature sensors 110F. In other words, the temperature sensors 110 of FIG. 12 may not include second temperature sensors for each of the battery cells 112 or for the adjacent group 114 of the battery cells 112 (e.g., a common temperature sensor). Each of the first temperature sensors 110F of FIG. 12 is connected in signal communication with the first control channel 94 of the BMS controller 92. The use of a single temperature sensor 110 (e.g., the first temperature sensors 110E) for each of the battery cells 112 and a single control lane of the controllers 28, 92 may facilitate further reductions in cost, weight, and complexity of the electrical assembly 24.

In some embodiments, the engine controller 28 (and/or the BMS controller 92) may be configured to execute an artificial intelligence (AI) model 136 (hereinafter "model" 136), to identify failure of the first temperature sensors 110E similar to that described above, through execution of the instructions stored in the memory 106 by the processor 104 of the first control channel 98. While the model 136 is described herein with respect to the embodiments of FIG. 12, aspects of the present disclosure model 136 may be equally applicable to the other embodiments described herein to identify failure of temperature sensors 110. Non-limiting examples of the model 136 include different types of AI models including statistical learning methods, or heuristic methods, machine learning models, or the like. The present disclosure is not limited to using any particular AI model for the model 136. The model 136 is trained to identify correlation or non-correlation of the measured T1 temperatures of the battery cells 112 based on one or more operational parameters of the electrical assembly 24. The operating parameters may include electrical parameters of the electrical assembly 24 such as, but not limited to, battery 64 charge or discharge current, battery 64 voltages, electrical assembly 24 loading, battery 64 state of charge, battery string 72 utilization, average temperatures of the battery cells 112, average temperatures for adjacent groups 114 of the battery cells 112, and the like. The operating parameters may additionally include mission parameters of the aircraft 1000 (see FIG. 1) and its propulsion system 20 such as, but not limited to, air speed, altitude, and/or propulsion system 20 power output. The operating parameters may additionally include aircraft 1000 ambient conditions such as ambient air temperature.

The model 136 may be trained using a supervised learning methodology and/or an unsupervised learning methodology. The model 136 trained using a supervised learning methodology may be prepared using a training process that includes making predictions based on a body of data (e.g., a training set of labeled battery cell 112 temperature data and operational parameter data) and refining those predictions until the model 136 achieves a desired level of accuracy. The refining process may typically include testing and validating the model 136 using the collected data. In contrast to a supervised learning methodology, an unsupervised learning methodology may use unlabeled battery cell 112 temperature data and operational parameter data and make predictions based on the input data to generate patterns that exist within the input data. The process of generating the patterns may use various techniques, including but not limited to cluster analysis (e.g., hierarchical clustering, k-means, mixture models, DBSCAN, OPTICS, and the like), principal component, etc. The present disclosure is not limited to using any particular unsupervised learning methodology.

The model 136 may be trained during operation of the propulsion system 20 and its electrical assembly 24. The model 136 may additionally or alternatively be trained independent of the operation of the propulsion system 20 and its electrical assembly 24 (e.g., using an unsupervised learning methodology or a supervised learning methodology including verification by an operator). For example, the model 136 may be trained using historical operating data for one or more same or similar propulsion systems and/or engines. For further example, the model 136 may be trained using simulated operating data for the propulsion system 20 and its electrical assembly 24. Accordingly, the model 136 may be trained to correlate the battery cell 112 temperatures to operating conditions of the propulsion system 20 and its electrical assembly 24. Based on the training, the model 136 may determine an expected temperature range for each of the battery cell 112 temperatures corresponding to a given set of operating conditions of the propulsion system 20 and its electrical assembly 24. The model 136 may identify a failure of the first temperature sensors 110F where any of the first temperature sensors 110F have a T1 temperature output which is outside of the expected temperature range.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

The terms "substantially," "about," "approximately," and other similar terms of approximation used throughout this patent application are intended to encompass variations or ranges that are reasonable and customary in the relevant field. These terms should be construed as allowing for variations that do not alter the basic essence or functionality of the invention. Such variations may include, but are not limited to, variations due to manufacturing tolerances, materials used, or inherent characteristics of the elements described in the claims, and should be understood as falling within the scope of the claims unless explicitly stated otherwise.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase “means for.” As used herein, the terms “comprise”, “comprising”, or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A propulsion system for an aircraft, the propulsion system comprising:

a battery including a plurality of battery cells;

a battery management system including a plurality of temperature sensors and a single-channel battery management system (BMS) controller, the plurality of temperature sensors including a plurality of first temperature sensors and at least one second temperature sensor, each temperature sensor of the plurality of first temperature sensors disposed at a respective battery cell of the plurality of battery cells, the at least one second temperature sensor disposed at the plurality of battery cells, the single-channel BMS controller including a BMS control channel connected in signal communication with the plurality of first temperature sensors; and an engine controller including a first engine control channel and a second engine control channel, the first engine control channel connected in signal communication with the BMS control channel to form a first control lane including the first engine control channel, the BMS control channel, and the plurality of first temperature sensors, the second engine control channel connected in signal communication with the at least one second temperature sensor to form a second control lane, independent of the first control lane, including the second engine control channel and the at least one second temperature sensor.

2. The propulsion system of claim 1, wherein the at least one second temperature sensor includes a plurality of second temperature sensors, each temperature sensor of the plurality of second temperature sensors is disposed at a respective battery cell of the plurality of battery cells.

3. The propulsion system of claim 2, wherein the BMS control channel, the first engine control channel, and the second engine control channel each include a processor connected in signal communication with a non-transitory memory storing instructions which, when executed by the processor, cause the processor to:

for the BMS control channel, monitor, using each first temperature sensor of the plurality of first temperature sensors, a respective T1 temperature of each battery cell of the plurality of battery cells, and for the second engine control channel, monitor, using each second temperature sensor of the plurality of second temperature sensors, a respective T2 temperature of each battery cell of the plurality of battery cells.

4. The propulsion system of claim 3, wherein the instructions, when executed by the processor of each of the first engine control channel and the second engine control channel, further cause the processor to compare the T1 temperature of each battery cell of the plurality of battery cells to the T2 temperature of each respective battery cell of the plurality of battery cells and identify agreement or disagreement between the T1 temperature of each battery cell of the plurality of battery cells and the T2 temperature of each respective battery cell of the plurality of battery cells.

5. The propulsion system of claim 4, wherein identifying agreement or disagreement between the T1 temperature of each battery cell of the plurality of battery cells and the T2 temperature of each respective battery cell of the plurality of battery cells includes comparing a temperature difference between the T1 temperature of each battery cell of the plurality of battery cells and the T2 temperature of each respective battery cell of the plurality of battery cells to a temperature agreement threshold.

6. The propulsion system of claim 1, wherein the plurality of battery cells forms an adjacent group of the plurality of battery cells.

7. The propulsion system of claim 6, wherein the at least one second temperature sensor includes a single, common temperature sensor disposed at the adjacent group of the plurality of battery cells.

8. The propulsion system of claim 7, wherein the BMS control channel, the first engine control channel, and the second engine control channel each include a processor connected in signal communication with a non-transitory memory storing instructions which, when executed by the processor, cause the processor to:

for the BMS control channel, monitor a T1 temperature of each battery cell of the plurality of battery cells measured using the plurality of first temperature sensors, and for the second engine control channel, monitor a representative T2 temperature of the adjacent group of the plurality of battery cells measured using the at least one second temperature sensor.

9. The propulsion system of claim 8, wherein the instructions, when executed by the processor of each of the first engine control channel and the second engine control channel, further cause the processor to compare the T1 temperature of each battery cell of the plurality of battery cells to the representative T2 temperature and identify agreement or disagreement between the T1 temperature of each battery cell of the plurality of battery cells and the representative T2 temperature.

10. The propulsion system of claim 9, wherein identifying agreement or disagreement between the T1 temperature of each battery cell of the plurality of battery cells and the representative T2 temperature includes comparing a temperature difference between the T1 temperature of each battery cell of the plurality of battery cells to the representative T2 temperature to a temperature agreement threshold.

11. The propulsion system of claim 1, wherein the BMS control channel, the first engine control channel, and the second engine control channel each include a processor connected in signal communication with a non-transitory memory storing instructions which, when executed by the processor, cause the processor to:

execute a model trained to identify a faulted condition or an unfaulted condition of each temperature sensor of the plurality of temperature sensors, based on one or more operating parameters of the propulsion system, by:

for the first control channel, comparing a T1 temperature of each battery cell of the plurality of battery cells measured using the plurality of first temperature sensors to a first expected temperature range determined using the one or more operating parameters, and for the second control channel, comparing at least one T2 temperature of the plurality of battery cells measured using the at least one second temperature sensor to a second expected temperature range determined using the one or more operating parameters.

12. A propulsion system for an aircraft, the propulsion system comprising:

a battery including a plurality of battery cells, the plurality of battery cells arranged as an adjacent group;

a battery management system including a plurality of temperature sensors and a single-channel battery management system (BMS) controller, the plurality of temperature sensors including a plurality of first temperature sensors and at least one second temperature sensor, each temperature sensor of the plurality of first temperature sensors disposed at a respective battery cell of the adjacent group of the plurality of battery cells, the at least one second temperature sensor disposed at the adjacent group of the plurality of battery cells, the single-channel BMS controller including a BMS control channel; and an engine controller including a first engine control channel and a second engine control channel, each of the BMS control channel, the first engine control channel, and the second engine control channel including an independent processing system, the BMS control channel and the first engine control channel forming a first control lane with the plurality of first temperature sensors or the at least one second temperature sensor, the second engine control channel forming a second control lane, independent of the first control lane, with an other of the plurality of first temperature sensors or the at least one second temperature sensor.

13. The propulsion system of claim 12, wherein the at least one second temperature sensor includes a plurality of second temperature sensors, each temperature sensor of the plurality of second temperature sensors is disposed at a respective battery cell of the plurality of battery cells.

14. The propulsion system of claim 12, wherein the at least one second temperature sensor includes a single, common temperature sensor disposed at the adjacent group of the plurality of battery cells.

15. The propulsion system of claim 12, wherein each temperature sensor of the plurality of first temperature sensors has a first temperature sensor configuration, each temperature sensor of the at least one second temperature sensor has a second temperature sensor configuration, and the second temperature sensor configuration is different than the first temperature sensor configuration.

16. The propulsion system of claim 12, wherein each battery cell of the plurality of battery cells is positioned adjacent at least one other battery cell of the plurality of battery cells.

17. A propulsion system for an aircraft, the propulsion system comprising:

a battery including a plurality of battery cells;

a battery management system including a plurality of temperature sensors and a battery management system (BMS) controller, the plurality of temperature sensors including at least one first temperature sensor and at least one second temperature sensor, the at least one first temperature sensor and the at least one second temperature sensor disposed at the plurality of battery cells, the BMS controller including a BMS control channel connected in signal communication with the at least one first temperature sensor; and an engine controller including a first engine control channel and a second engine control channel, the first engine control channel connected in signal communication with the BMS control channel to form a first control lane including the first engine control channel, the BMS control channel, and the at least one first temperature sensor, the second engine control channel directly connected in signal communication with the at least one second temperature sensor to form a second control lane, independent of the first control lane, including the second engine control channel and the at least one second temperature sensor.

18. The propulsion system of claim 17, wherein the at least one first temperature sensor includes a single, common temperature sensor and the at least one second temperature sensor includes a plurality of second temperature sensors, each temperature sensor of the plurality of second temperature sensors is disposed at a respective battery cell of the plurality of battery cells.

19. The propulsion system of claim 17, wherein the at least one first temperature sensor includes a plurality of first temperature sensors, each temperature sensor of the plurality of first temperature sensors is disposed at a respective battery cell of the plurality of battery cells, and the at least one second temperature sensor includes a single, common temperature sensor.

20. The propulsion system of claim 17, wherein the at least one first temperature sensor includes a plurality of first temperature sensors, each temperature sensor of the plurality of first temperature sensors is disposed at a respective battery cell of the plurality of battery cells, the at least one second temperature sensor includes a plurality of second temperature sensors, and each temperature sensor of the plurality of second temperature sensors is disposed at a respective battery cell of the plurality of battery cells.

* * * * *